United States Patent

Xuan

[11] Patent Number: 6,068,728
[45] Date of Patent: May 30, 2000

[54] LASER TEXTURING WITH REVERSE LENS FOCUSING SYSTEM

[75] Inventor: Jialuo Jack Xuan, Milpitas, Calif.

[73] Assignee: Seagate Technology, Inc., Scotts Valley, Calif.

[21] Appl. No.: 08/919,120

[22] Filed: Aug. 28, 1997

[51] Int. Cl.$^7$ ...................................................... C23F 1/02
[52] U.S. Cl. ...................... 156/345; 118/50.1; 219/121.6; 219/121.75
[58] Field of Search .......................... 118/50.1; 156/345; 219/121.6, 121.68, 121.69, 121.75; 369/44.38

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Leureau et al. . |
| 4,789,230 | 12/1988 | Ohta .......................................... 350/480 |
| 4,942,586 | 7/1990 | Lai ............................................ 372/68 |
| 5,062,021 | 10/1991 | Ranjan et al. . |
| 5,128,914 | 7/1992 | Kurata et al. . |
| 5,166,006 | 11/1992 | Lal et al. . |
| 5,202,810 | 4/1993 | Nakamura et al. . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |
| 5,490,896 | 2/1996 | Yagi et al. ................................. 156/345 |
| 5,783,797 | 7/1998 | Xuan et al. ............................... 219/121.69 |
| 5,815,301 | 9/1998 | Naiki et al. ............................... 359/205 |
| 5,853,820 | 12/1998 | Kuo et al. ................................. 427/55 |
| 5,860,967 | 1/1999 | Zavislan et al. .......................... 606/9 |

FOREIGN PATENT DOCUMENTS

| | | |
|---|---|---|
| 0652554 | 5/1995 | European Pat. Off. . |

OTHER PUBLICATIONS

"A New Laser Texturing Technique for High Performance Magnetic Disk Drives," IEEE Transactions on Magnetics, vol. 31, No. 6, pp. 2946–2951, Nov. 1995.

"Laser Zone Texturing on Glass and Glass–Ceramic Substrates," Presented at the Magnetic Recording Conference (TMRC), Santa Clara, California, Aug. 19–21, 1996.

"Laser Zone Texturing on Glass and Glass–Ceramic Substrates."

*Primary Examiner*—Richard Bueker
*Assistant Examiner*—Luz Alejandro
*Attorney, Agent, or Firm*—McDermott, Will & Emery

[57] ABSTRACT

The depth of focus of a lens focusing system for laser texturing a magnetic recording medium is increased by reversing the lens system. Lens reversal provides symmetrical energy distributions in both negative and positive defocus ranges. An embodiment includes a lens focusing system comprising a planoconvex lens, wherein the laser light beam is passed into the planar surface and out through the convex surface to impinge upon a substrate. Another embodiment includes a multiple lens focusing system comprising an aplanatic meniscus lens and a companion doublet, wherein the laser light beam is sequentially passed into a concave surface of the aplanatic meniscus lens and through the companion doublet lens.

7 Claims, 12 Drawing Sheets

Optical Layout

Optical Layout

Optical Layout

FIG. 3A (Prior Art)

Defocus 0 μm

FIG. 3B (Prior Art)

Defocus -50 μm

FIG. 3C (Prior Art)

Defocus 50 μm

FIG. 3D (Prior Art)

Optical Layout

FIG. 4A (Prior Art)

Defocus 0 μm

FIG. 4B (Prior Art)

Defocus -50 μm

FIG. 4C (Prior Art)

Defocus 50 μm

Optical Layout

FIG. 6A

Defocus 0 μm

FIG. 6B

Defocus -50 μm   FIG. 6C

Defocus 50 μm

Defocus -50 μm

FIG. 7C

Defocus 50 μm

LASER TEXTURING WITH REVERSE LENS FOCUSING SYSTEM

TECHNICAL FIELD

The present invention relates generally to texturing a magnetic recording medium. The present invention is particularly applicable to accurately texturing a high density recording magnetic recording medium to provide a low flying height.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The texturing treatment can be applied to the underlayer rather than the substrate.

Figure 1:
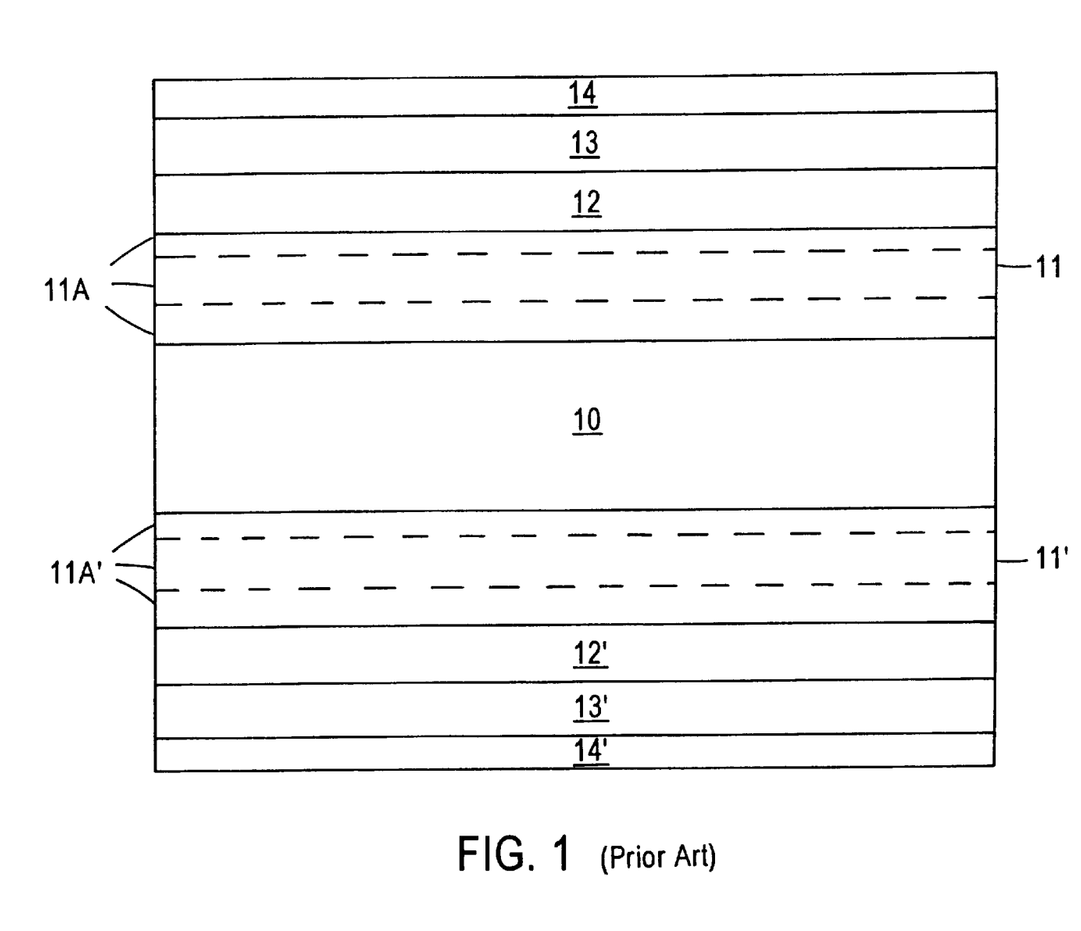
FIG. 1 schematically illustrates a conventional magnetic recording medium.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorous (NiP). Alternative substrates include glass, ceramic and glass-ceramic materials and graphite. Substrate 10 typically contains sequentially deposited on each side thereof an underlayer, such as chromium (Cr) or a Cr-alloy 11, 11', a magnetic layer, such as a cobalt (Co)-base alloy 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective carbon overcoat 13, 13' are usually deposited by sputtering techniques performed in an apparatus containing sequential deposition chambers. A conventional Al-alloy substrate is provided with a NiP plating, primarily to increase the hardness of the Al substrate, serving as a suitable surface for polishing to provide a texture, which is substantially reproduced on the disk surface.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

An alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995.

In copending application Ser. No. 08/666,374 filed on Jun. 27, 1996 a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused laser light beam is passed through a crystal material to control the spacing between resulting protrusions.

In copending PCT application Ser. No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

It is recognized that laser texturing of alternate substrates such as glass, ceramic and glass-ceramic materials, is attendant upon several problems, notably microcracking. EPA 0652554 A1 addresses such a microcracking problem by controlling the radiant energy fluence during laser texturing so that it is less than the thermal shock threshold for the particular material undergoing laser texturing.

In copending application Ser. No. 08/796,830 filed on Feb. 7, 1997, a method is disclosed for laser texturing a glass or glass-ceramic substrate, wherein the height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam. In copending application Ser. No. 08/919,100 filed Aug. 28,1997 (Our Docket No. 2674-054), a laser texturing technique is disclosed employed a dual fiber delivery system to separately control nucleation and crystallization growth rate, thereby avoiding thermal shock to an alternate substrate comprising a glass, ceramic or glass-ceramic substrate.

It is inevitable that the surface of a magnetic recording medium exhibits unevenness or waviness. In the magnetic recording industry, such lack of topographical uniformity is called "runout." The acronym "RVA" is employed in the magnetic recording industry to denote "Runout Velocity Acceleration," describing the motion of a rotating body as it deviates from an ideal plane of reference. In rigid disk and drive manufacturing, the two important reference directions are the axial direction which is parallel to the long axis of the spindle motor and perpendicular to the plane of rotation of the disk, and the radial direction which is perpendicular to the long axis of the motor and in the plane of rotation of the disk.

As flying heights are reduced lower and lower, the dynamics and limitations of the disk surface mechanical parameters become more and more critical. This problem becomes particularly acute in laser texturing, wherein topographical variations due to surface runout, particularly due to clamping of the periphery of the disk substrate, exceeds the depth of focus capabilities of conventional lens focusing systems employed in laser texturing.

There is a continuing need in the magnetic recording media industry for an efficient method and apparatus for uniformly texturing a magnetic recording medium to obtain an accurate controllable pattern of protrusions enabling lower flying heights. There exists a particular need for an efficient method and apparatus for laser texturing a magnetic recording medium, wherein the depth of focus of the lens focusing system is greater than the topographical variations due to surface runout.

DISCLOSURE OF THE INVENTION

An object of the present invention is a method and apparatus for texturing a magnetic recording medium to provide a controllable pattern of protrusions thereon.

Another object of the present invention is a method and apparatus for laser texturing a magnetic recording medium wherein surface runout is compensated by improving the depth of focus of a lens focusing system for laser texturing.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a method of manufacturing a magnetic recording medium, which method comprises: laser texturing a surface of the medium through a lens comprising a first convex surface and a second surface, wherein the laser light beam is initially passed into the second surface through the lens and out of the first convex surface to impinge upon the medium surface.

Another aspect of the present invention is a method of manufacturing a magnetic recording medium, which method comprises: laser texturing a surface of a magnetic recording medium by passing a laser light beam through a lens focusing system comprising a first aplanatic meniscus lens having a first convex surface and a second concave surface and a second companion doublet lens having a first convex surface and a second surface, wherein the laser light beam sequentially passes into the second concave surface of the first aplanatic meniscus lens, out of the second convex surface of the aplanatic meniscus lens, through the companion doublet lens and exits the first convex surface of the companion doublet lens.

A further aspect of the present invention is an apparatus for laser texturing and magnetic recording medium, which apparatus comprises: a laser light beam source; means for rotating a non-magnetic substrate; and a lens positioned between the laser light beam and the substrate, so that the laser light beam passes into the lens and impinges on the rotating substrate; wherein, the lens comprises a first convex surface and a second surface, and the lens is positioned so that the laser light beam passes initially into the second surface, through the lens and out of the first convex surface to impinge upon the relating medium substrate.

Another aspect of the present invention is an apparatus for laser texturing a magnetic recording medium, which apparatus comprises: a laser light beam source; means for rotating a non-magnetic substrate; and a lens system positioned between the laser light beam and the substrate; wherein, the lens system comprises a first aplanatic meniscus lens having a first convex surface and a second concave surface, and a second companion doublet lens having a first convex surface and a second surface, and the lens focusing system is positioned so that the laser light beam passes sequentially into the second concave surface of the first aplanatic meniscus lens, out of the first convex surface of the first aplanatic meniscus lens, and out of the first convex surface of the second companion doublet lens to impinge upon the rotating substrate.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention addresses and solves problems attendant upon laser texturing a magnetic recording medium to obtain reduced flying heights with reproducible accuracy. This objective is rendered problematic by inherent surface runout of disks, particularly while clamping the peripheral surface. The present invention solves that problem by the strategic use of a lens focusing system to compensate for inevitable surface runout by positioning the lens system to increase the depth of focus.

Figure 2:
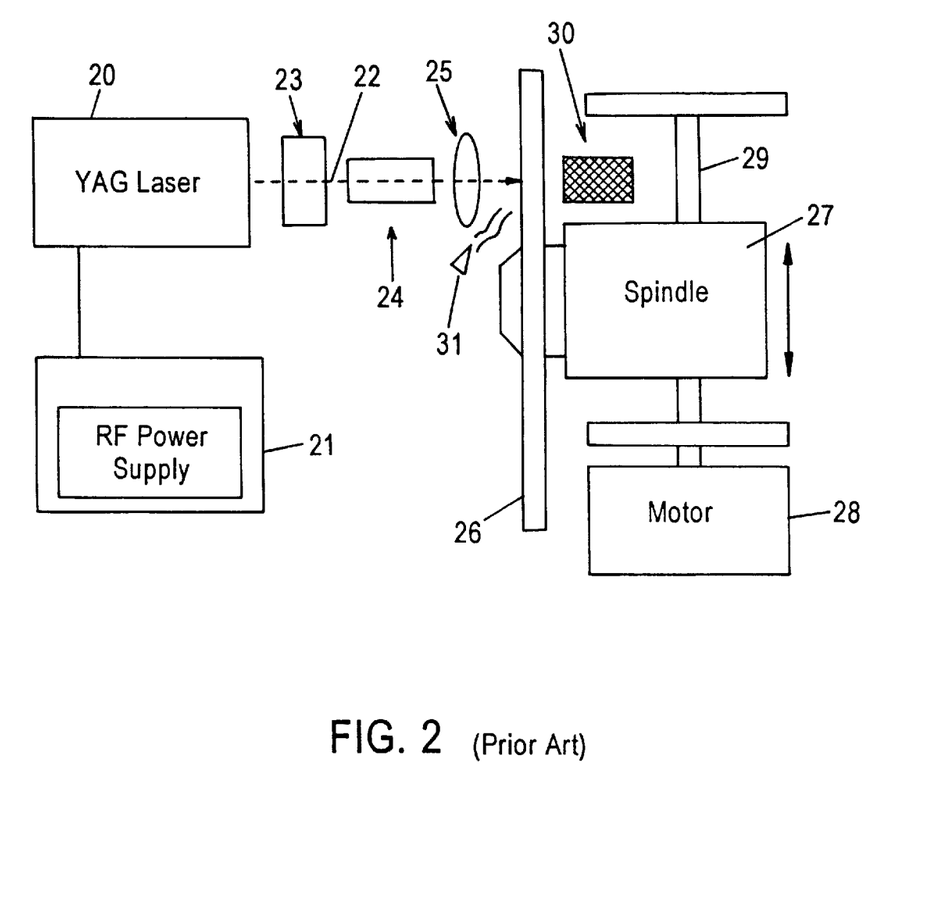
FIG. 2 schematically illustrates a conventional laser texturing apparatus.

An apparatus for laser texturing is depicted in FIG. 2 and comprises a YAG (yttrium-aluminum-garnet) diado pumped pulsed solid state laser 20 pulsed by power supply 21. Emitted laser light beam 22 passes through variable beam attenuator 23 and beam expander 24. Expanded laser light beam 22 is then focused by lens 25 onto the surface of substrate 26 which is driven by spindle 27 powered by motor 28. Substrate 26 and spindle 27 are mounted on a linear slide 29. A thermopile detector 30 measures the average laser power, which can be easily translated into pulse energy.

Figure 3A:
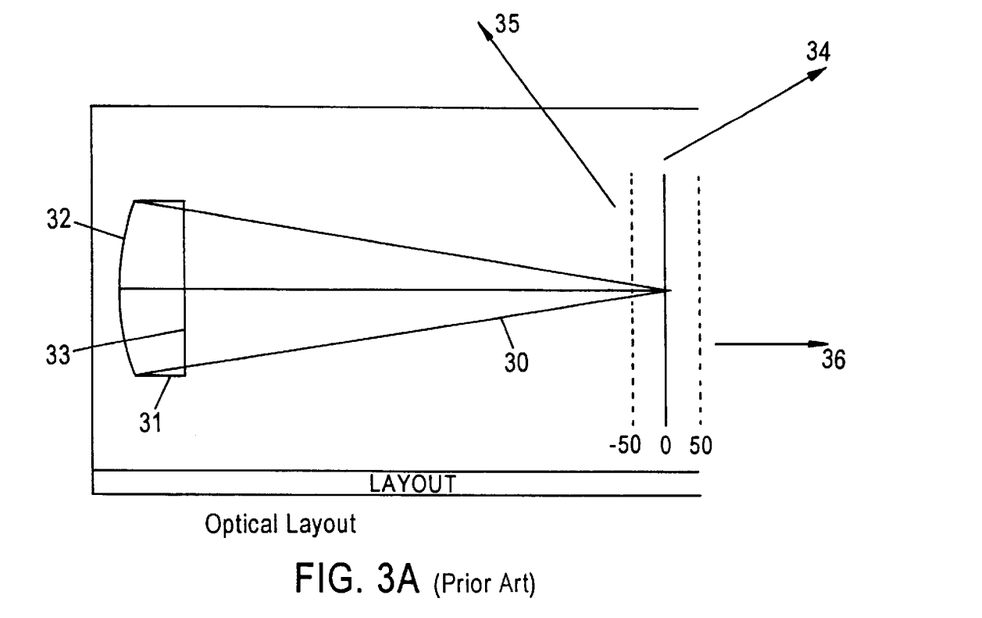
FIG. 3A schematically illustrates laser texturing employing a conventional planoconvex lens.
Figure 3B:
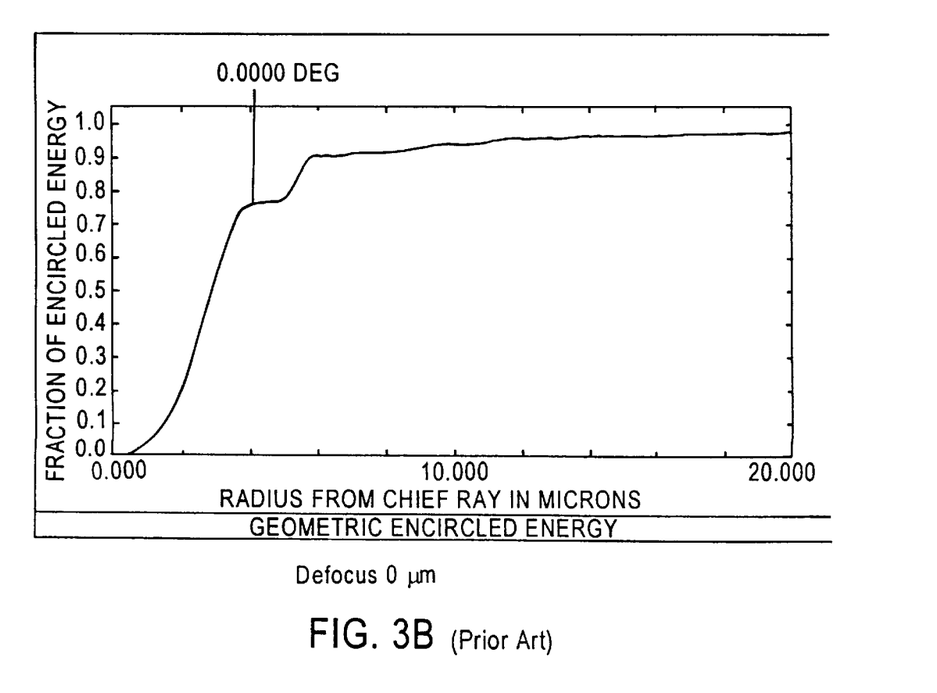
FIGS. 3B–3D schematically illustrate energy distributions at the substrate surface, negative defocus range and positive defocus range, respectively, of the FIG. 3A layout.
Figure 3C:
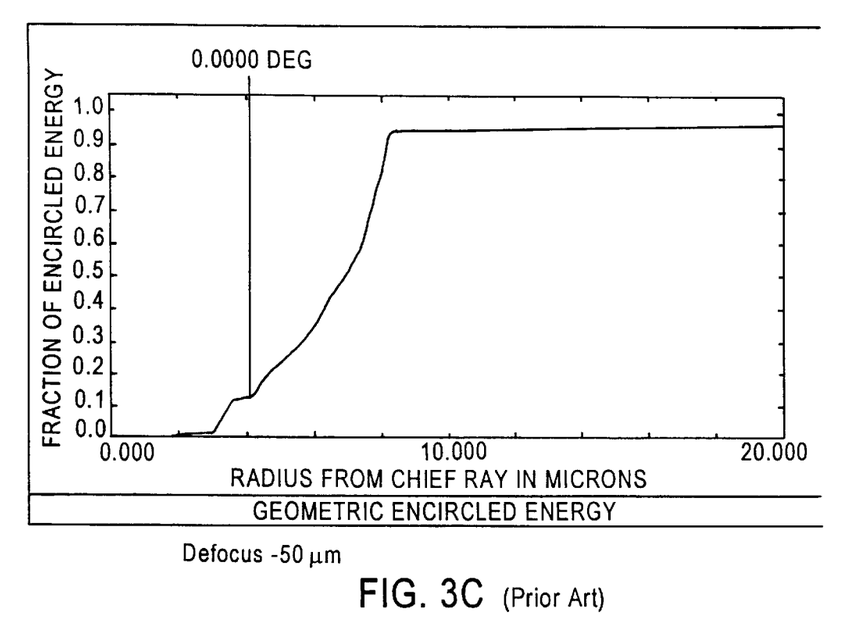
Figure 3D:
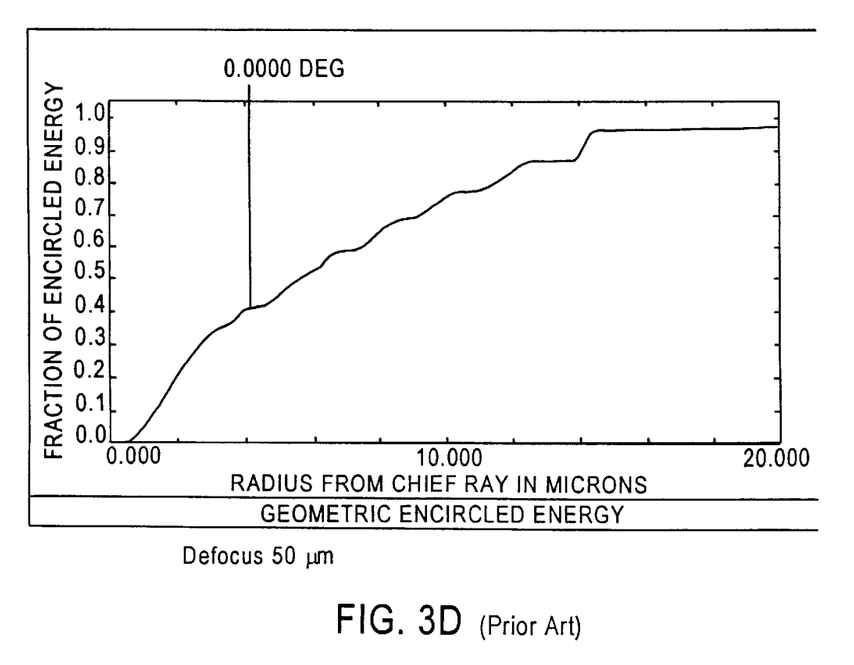

During initial experimentation and investigation, a substrate was laser textured employing a pulsed YAG laser light beam through a planoconvex lens as shown in FIG. 3A. Adverting to FIG. 3A, laser light beam 30 passes through planoconvex focusing lens 31 and impinges on substrate 34. Planoconvex lens 31 comprises a first convex surface 32 and a second substantially planar surface 33 facing toward the focusing direction of the laser light beam opposite substrate 34. Also indicated in FIG. 3A are dotted line 35 indicating a negative defocus range of 50 $\mu$m and dotted line 36 indicating a positive defocus range of 50 $\mu$m. The energy distributions at the focal point impinging of the substrate surface 34, at a negative defocus range of 50 $\mu$m and at a positive defocus range of 50 $\mu$m are depicted in FIGS. 3B, 3C and 3D, respectively. A comparison of FIGS. 3C and 3D reveals that the energy distributions for the negative and positive defocus ranges are not symmetrical.

Figure 4A:
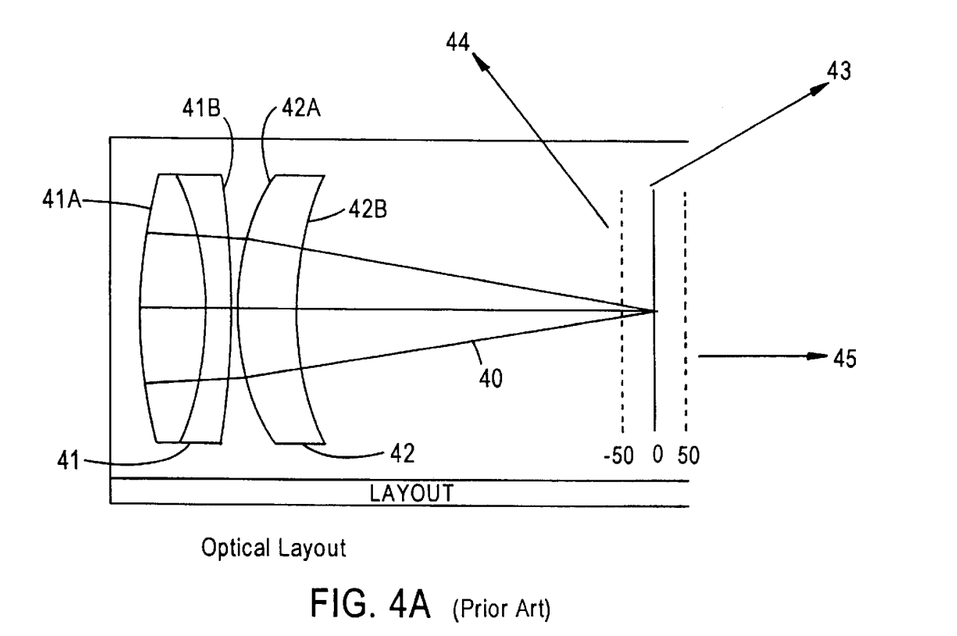
FIG. 4A schematically illustrates laser texturing employing a conventional multiple lens focusing system.
Figure 4B:
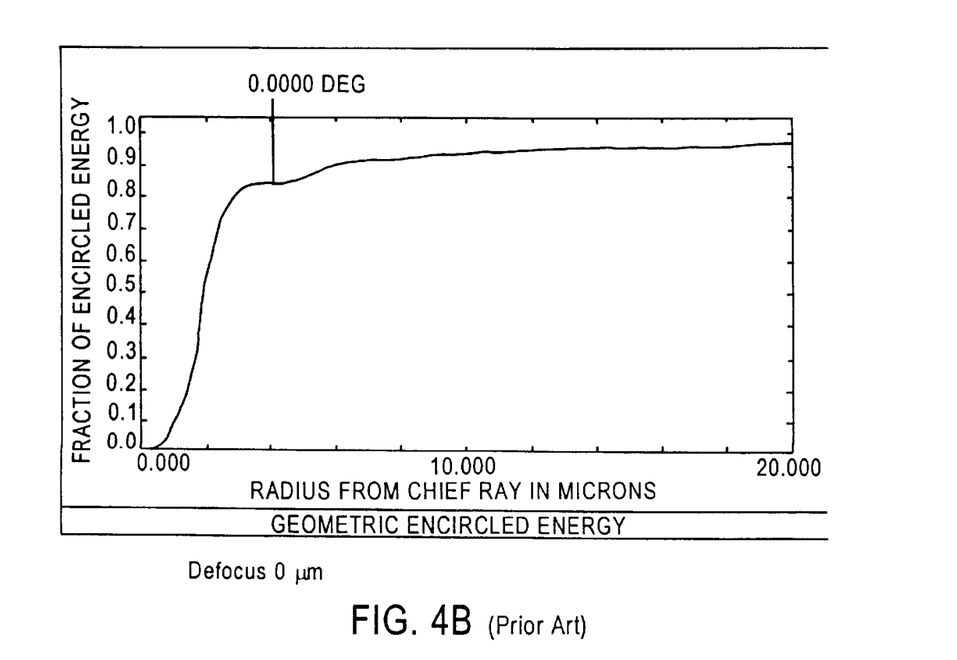
FIGS. 4B–4D represent energy distributions at a substrate surface, negative defocus range and positive defocus range, of the FIG. 4A layout.
Figure 4C:
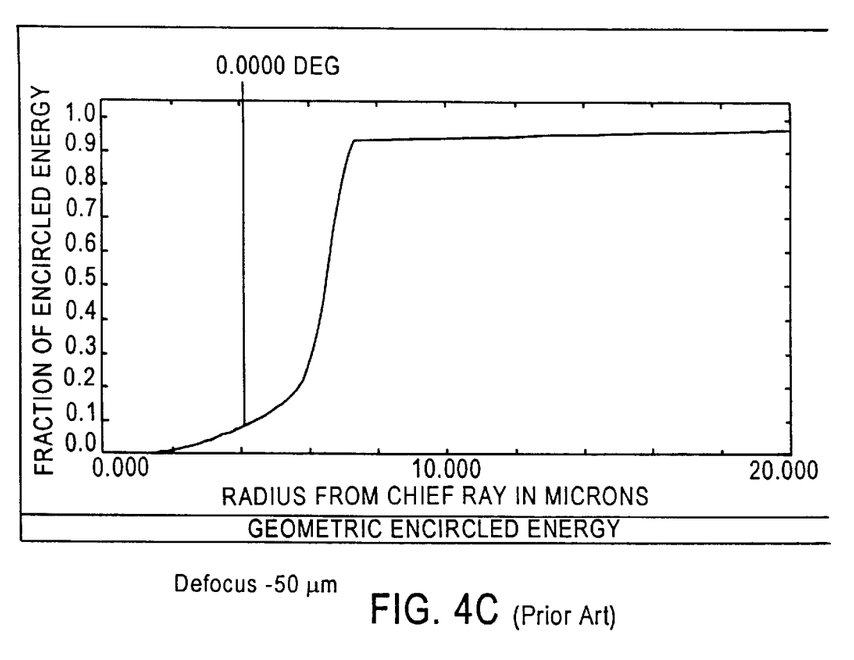
Figure 4D:
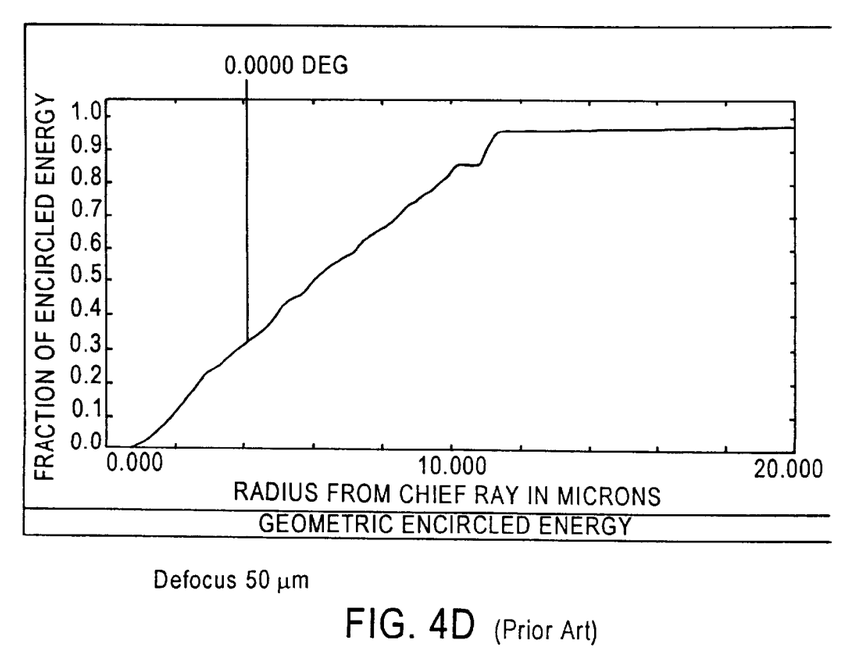

Further experimentation and investigation was conducted employing a multiple lens focusing system shown in FIG. 4A. Adverting to FIG. 4A, pulsed YAG laser light beam 40 passes through a lens focusing system comprising companion doublet lens 41, having a first convex surface 41A and a second substantially planar surface 41B, and then through an aplanatic meniscus lens having a first convex surface 42A and a second concave surface 42B. Focused laser light beam 40 impinges at the focal point on substrate surface 43. Dotted lines 44 and 45 represent negative and positive defocusing ranges of 50 $\mu$m, respectively. The energy distribution impinging at the focal point on substrate 43 is shown graphically in FIG. 4B, while the energy distributions for the negative defocus range 44 and positive defocus range 45 are shown graphically in FIGS. 4C and 4D, respectively.

Figure 5:
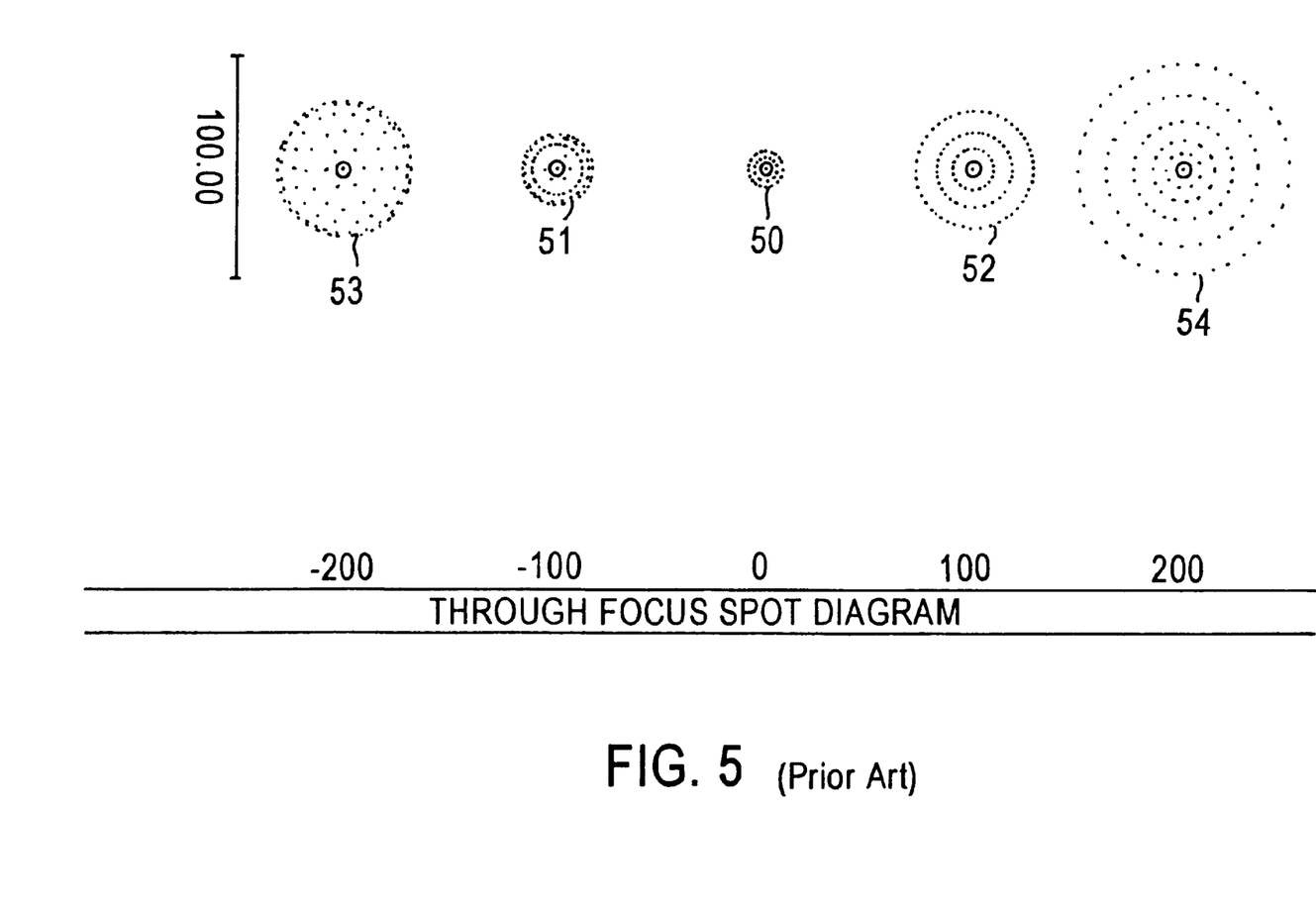
FIG. 5 illustrates energy distribution plots at the substrate, and negative and positive defocus ranges for the in FIG. 4A layout.

FIG. 5 shows energy distribution plots taken of the system depicted in FIG. 4A at the focal point on the substrate surface represented by reference numeral 50, at a negative defocus range of 100 $\mu$m represented by a reference numeral 51, at a positive defocus range of 100 $\mu$m represented by a reference numeral 52, at a negative defocus range of –200 $\mu$m represented by reference numeral 53, and at a positive defocus range of 400 $\mu$m represented by reference numeral 54. It is apparent from FIGS. 4C and 4D and from FIG. 5 that the energy distributions are not symmetrical for the negative and positive defocus ranges employing the multiple lens focusing system shown in FIG. 4A.

After extensive experimentation and investigation, it was discovered that the energy distributions for the negative and positive defocus ranges employing a lens focusing system for laser texturing a substrate can be made symmetrical by reversing the lens surfaces employed in conventional lens focusing systems. For example, in accordance with an embodiment of the present invention, employing a single lens having a convex surface, such as the planoconvex lens 31 depicted in FIG. 3A, the laser light beam is passed initially through the substantially planar surface 33 to exit the convex surface 32, in the reverse manner that such a planoconvex lens would be conventionally employed for focusing. In another embodiment of the present invention, employing a dual lens focusing system, such as that depicted in FIG. 4A comprising companion doublet lens 41 and aplanatic meniscus lens 42, the laser light beam is sequentially passed into the concave surface 42B of the aplanatic meniscus lens 42 then into the substantially planar surface 41B of the companion doublet lens 41 to exit convex surface 41A of the companion doublet lens and then to impinge upon a substrate surface.

Figure 6A:
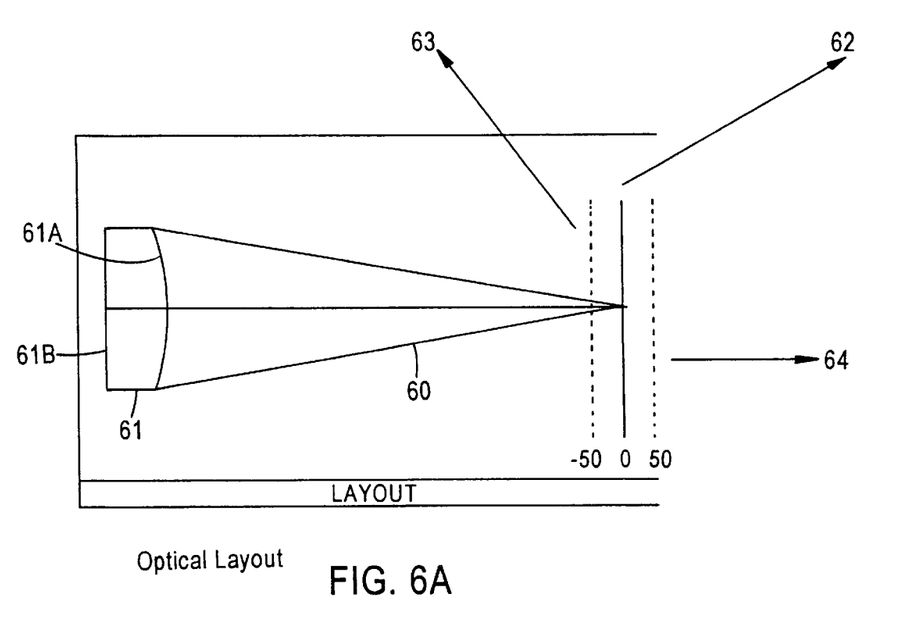
FIG. 6A illustrates an embodiment of the present invention employing a planoconvex lens.
Figure 6B:
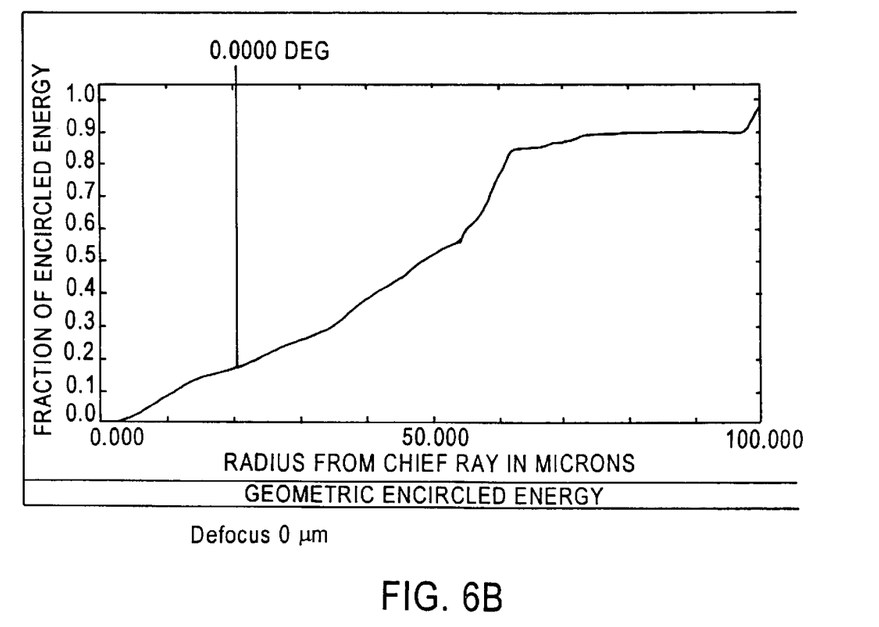
FIG. 6B illustrates the energy distribution at the substrate surface for the FIG. 6A embodiment.
Figure 6C:
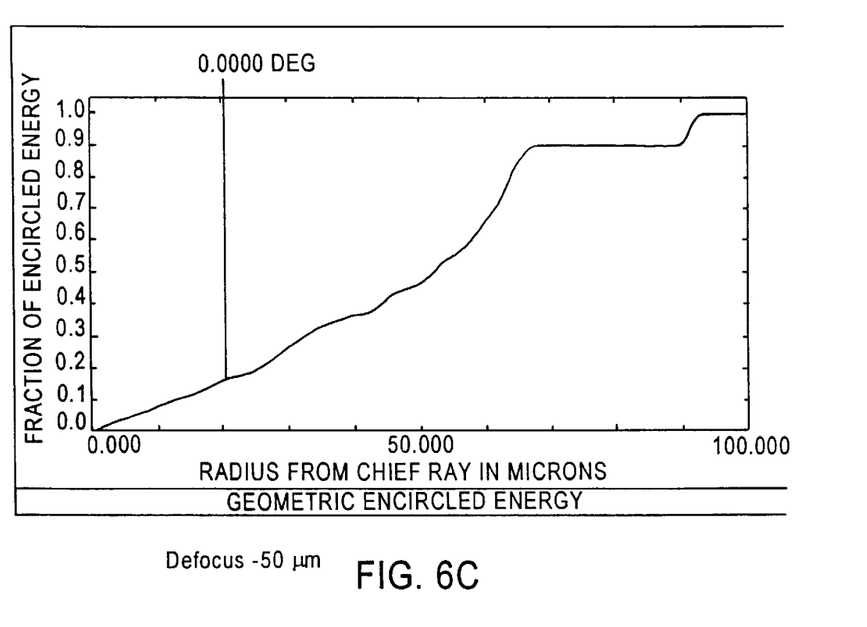
FIGS. 6C and 6D illustrate substantially symmetrical energy distributions at negative and positive defocus ranges for the FIG. 6A embodiment.
Figure 6D:
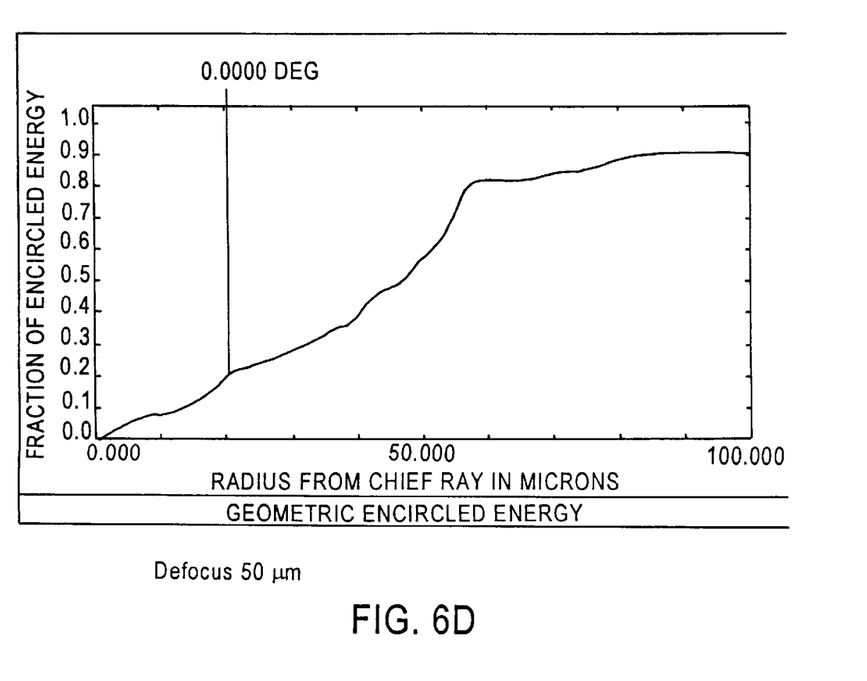

An embodiment of the present invention employing a single lens is depicted in FIG. 6A, wherein a pulsed YAG laser light beam 60 passes through planoconvex lens 61 and impinges at a focal point on substrate 62. In accordance with this embodiment of the present invention, planoconvex lens 61 is positioned so that the pulsed YAG laser light beam 60 initially passes into substantially planar surface 61B and exits convex surface 61A facing toward substrate 62 such that focused laser light beam 60 impinges on substrate 62 at the focal point. Dotted lines 63 and 64 represent defocused ranges of −50 μm and +50 μm, respectively. The energy distribution at the substrate surface 62 is shown in FIG. 6B. The energy distribution at negative defocus range 63 is shown in FIG. 6C, while the energy distribution at positive defocus range 64 is shown in FIG. 6D. Significantly, a comparison of FIGS. 6C and 6D reveals that the energy distribution in both the negative and positive defocus ranges is substantially symmetrical. Such substantially symmetrical energy distributions in the negative and positive defocus ranges compensate for topographical variations due to inevitable surface runout during laser texturing, thereby enabling protrusions to be formed with high accuracy and uniformity at a significant reduced height so that reduced flying heights can be achieved.

Figure 7A:
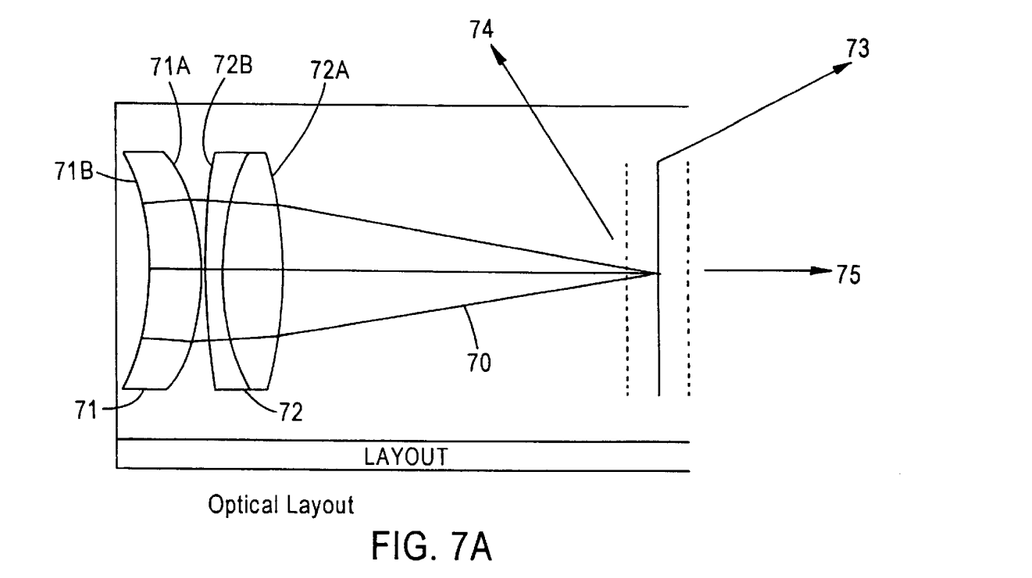
FIG. 7A illustrates another embodiment of the present invention employing a multiple lens focusing system.
Figure 7B:
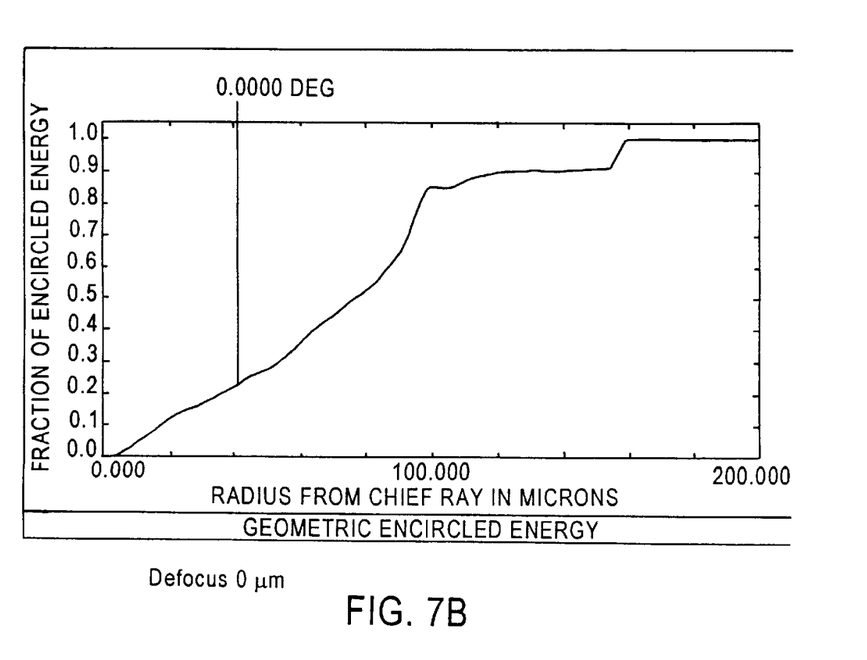
FIG. 7B illustrates the energy distribution at the substrate surface for the FIG. 7A embodiment.
Figure 7C:
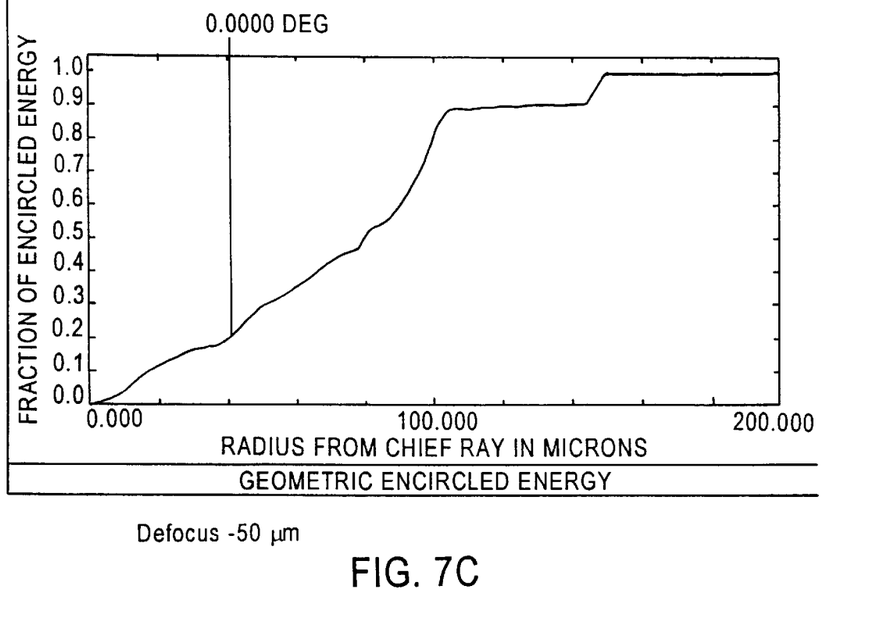
FIGS. 7C and 7D illustrate symmetrical energy distributions in the negative and positive defocus ranges for the FIG. 7A embodiment.
Figure 7D:
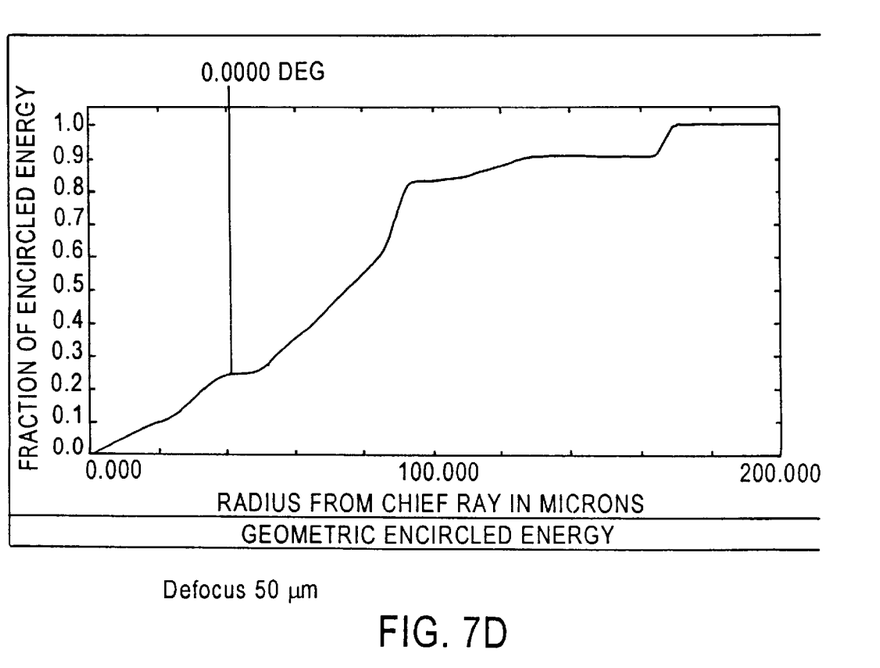

In accordance with another embodiment of the present invention, a multiple lens focusing system is employed to laser texture a substrate. However, the multiple lens focusing system is positioned in a reverse manner to that of a conventional multiple lens focusing system, as shown in FIG. 7A. Adverting to FIG. 7A, pulsed YAG laser light beam 70 passes through a multiple lens focusing system comprising aplanatic meniscus lens 71 and companion doublet 72, which are positioned in the reverse manner as in a conventional multiple lens focusing system. Thus, in the embodiment depicted in FIG. 7A, the laser light beam 70 initially passes into concave surface 71B of aplanatic meniscus lens 71 exiting convex surface 71A and then passes through substantially planar surface 72B of companion doublet lens 72 exiting convex surface 72A and impinging on substrate 73. Dotted lines 74 and 75 represent a negative defocus range of 50 μm and a positive defocus range of 50 μm, respectively. FIG. 7B shows the energy distribution at the surface of substrate 73. The energy distribution at negative defocus range 74 is shown in FIG. 7C, while the energy distribution at positive defocus range 75 is shown in FIG. 7D. It is apparent from comparison of FIG. 7C and FIG. 7D that the energy distributions in the negative and positive defocus ranges are substantially symmetrical, thereby compensating for topographical variations due to surface runout. Thus, the present invention provides compensation for surface runout, thereby enabling accurate and controllable laser texturing with reduced protrusion heights and, consequently reduced flying heights.

Figure 8:
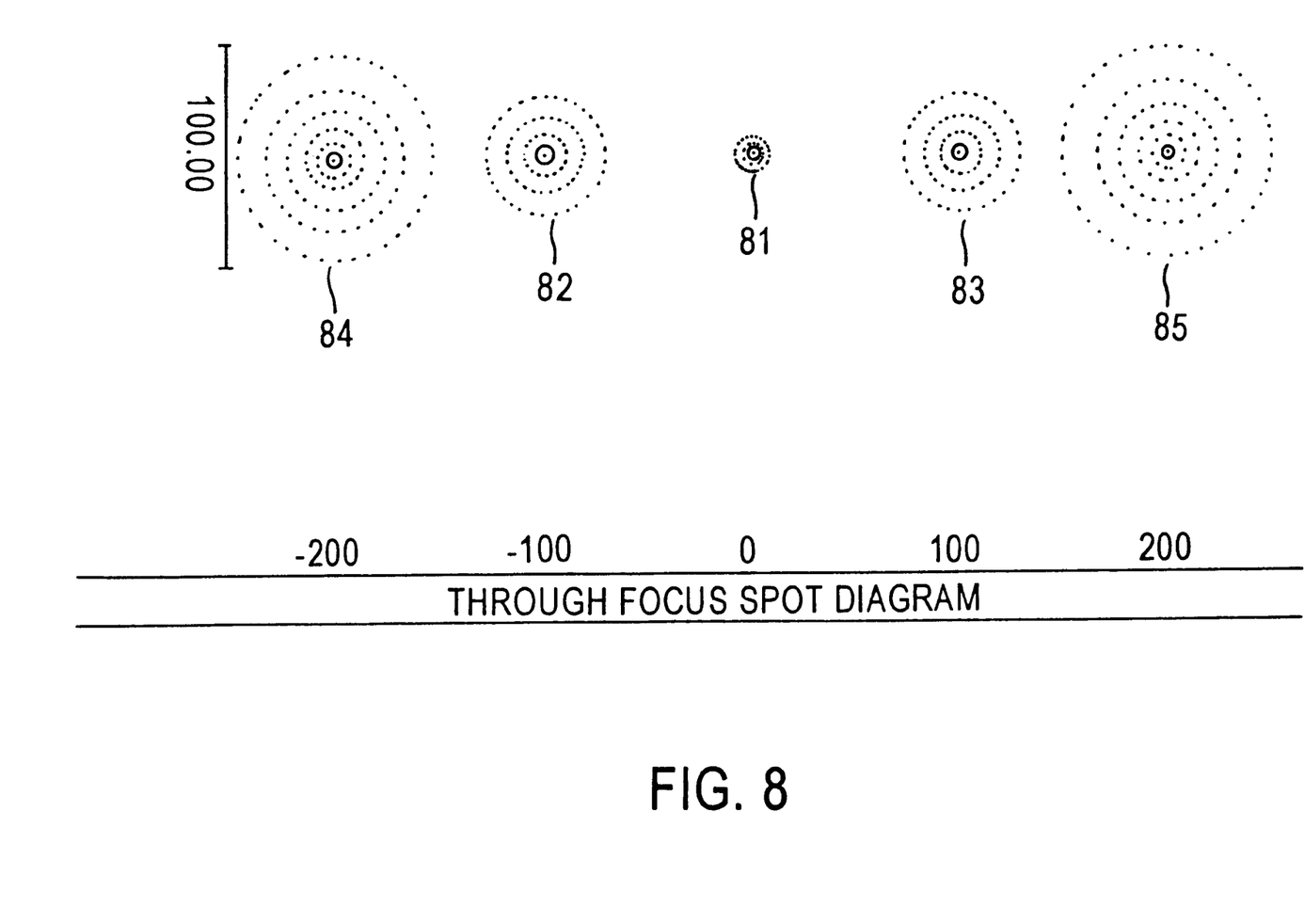
FIG. 8 illustrates symmetrical energy distribution plots in the negative and positive defocus ranges for the FIG. 7A embodiment.

The symmetry of the energy distributions in the positive and negative defocus ranges obtained in accordance with an embodiment of the present invention comprising a multiple lens focusing system was confirmed by energy distribution plots shown in FIG. 8. Adverting to FIG. 8, reference numeral 81 represents the energy distribution at the surface of substrate 73, reference numerals 82 and 83 represent energy distributions at negative and positive defocus ranges of −100 μm and +100 μm, respectively, and reference numerals 84 and 85 represent energy distributions at defocus ranges of −200 μm and +200 μm, respectively. It is apparent from FIG. 8 that symmetrical energy distributions in the negative and positive defocus ranges are achieved, thereby compensating for topographical variations due to surface runout.

The present invention can be practiced employing any of various conventional laser texturing apparatuses, such as that depicted in FIG. 2, or that disclosed in EPA 0652554 A1, modified by reversing the lenses to achieve the benefits of the present invention whereby the energy distribution in the negative and positive defocus ranges is substantially symmetrical, thereby compensating for topographical variations due to surface runout. The present invention can be integrated into various conventional methods for manufacturing a magnetic recording medium wherein one of various surfaces formed is subjected to texturing, such as the surface of a non-magnetic substrate or an underlayer.

In practicing the present invention, any conventional non-magnetic substrate can be employed, such as NiP plated Al or Al-alloys. Glass, ceramic and glass-ceramic materials can also be employed, such as OHARA, Hoya and Nippon glass. The present invention can be employed to laser texture any of a variety of magnetic recording media, such as that depicted in FIG. 1.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention advantageously enables laser texturing of a magnetic recording medium to obtain a reduced flying height with greater accuracy and uniformity of laser formed protrusions and with greater repeatability, thereby optimizing tribologic and magnetic recordance compatible with the escalating requirements for high areal density and mobile computer data storage applications, such as laptop computers. The advantageous substantially symmetrical energy distributions obtained in the negative and positive defocus ranges result in laser formed textures having improved uniformity and greater repeatability from substrate to substrate. Moreover, the laser textures formed in accordance with the present invention are accurately reproduced on subsequently deposited layers in manufacturing a magnetic recording medium.

The present invention can be employed to produce any of various types of magnetic recording media, including thin film disks, with an attendant improvement in flying stability, glide performance and head medium interface reliability.

Moreover, the precise manner in which a substrate is laser textured in accordance with the present invention enables increased areal recording density and a reduction in the size of head sliders.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. An apparatus capable of laser texturing a surface of a magnetic recording medium, which apparatus comprises:

a laser light beam source;

means for rotating a non-magnetic substrate; and a lens positioned between the laser light beam and the substrate, so that the laser light beam passes through the lens and impinges on the rotating substrate; wherein the lens comprises a first convex surface and a second surface, and the lens is positioned so that the laser light beam passes initially into the second surface, through the lens and out of the first convex surface to impinge upon and texture the rotating medium substrate to form a plurality of protrusions thereon such, that the energy distribution in the negative and positive defocus ranges is substantially symmetrical.

2. The apparatus according to claim 1, wherein the lens is a planoconvex lens comprising a second substantially planar surface.

3. The apparatus according to claim 1, comprising a first lens and a second lens, wherein the first lens is an aplanatic meniscus lens having a first convex surface and a second concave surface, and the first and second lenses are positioned such that the laser light beam passes sequentially into the second concave surface of the first lens, out of the first convex surface of the first lens and through the second lens.

4. The apparatus according to claim 3, wherein the second lens is a companion doublet lens having a first convex surface facing the substrate and a second surface.

5. The apparatus according to claim 4, wherein the second surface of the companion doublet lens is substantially planar.

6. The apparatus according to claim 1, wherein the lens is positioned so that the laser light beam passes out of the first convex surface to directly impinge upon and texture the rotating medium surface.

7. An apparatus capable of laser texturing a surface of a magnetic recording medium, which apparatus comprises:

a laser light beam source;

means for rotating a non-magnetic substrate; and a lens positioned between the laser light beam and the substrate, so that the laser light beam passes through the lens and impinges on the rotating substrate; wherein the lens comprises a first convex surface and a second surface, and the lens is positioned so that the laser light beam passes initially into the second surface, through the lens and out of the first convex surface to directly impinge upon and texture the rotating medium substrate to form a plurality of protrusions thereon.

* * * * *